United States Patent [19]

Endo

[11] 3,859,731

[45] Jan. 14, 1975

[54] METHOD FOR DETERMINING THE POSITION OF A CAMERA FROM A PHOTOGRAPH TAKEN THEREBY AND DEVICE FOR PERFORMING THE SAME METHOD

[75] Inventor: Hidetomo Endo, Tokyo, Japan

[73] Assignee: Kyokuto Chosa - Sekkei Co. Ltd., Tokyo, Japan

[22] Filed: May 2, 1973

[21] Appl. No.: 356,606

[30] Foreign Application Priority Data
May 9, 1972 Japan............................. 47-45047

[52] U.S. Cl.................... 33/227, 33/1 C, 33/1 CC, 33/228, 33/274, 33/277, 354/354
[51] Int. Cl........................ G01c 21/20, G01b 21/02
[58] Field of Search......... 33/1 BB, 1 CC, 1 C, 274, 33/275, 276, 277, 227, 228; 95/1 R; 354/354

[56] References Cited
UNITED STATES PATENTS

| | | | |
|---|---|---|---|
| 2,697,234 | 12/1954 | Sturdevant............................ | 33/280 |
| 3,162,103 | 12/1964 | Perkins................................ | 95/1 R |
| 3,590,704 | 7/1971 | Endo.................................... | 33/228 |
| 3,621,578 | 11/1971 | Novakovic......................... | 33/76 VA |

Primary Examiner—Harry N. Haroian
Assistant Examiner—Steven L. Stephan
Attorney, Agent, or Firm—George B. Oujevolk

[57] ABSTRACT

Arrangement for determining the position from which a two-dimentional photograph was taken by an ordinary camera. The position is determined from the photograph itself by obtaining the horizontal angles between at least three known objects in the photograph and determining the position of the camera therefrom directly on a map or chart or indirectly by calculation.

8 Claims, 5 Drawing Figures

PATENTED JAN 14 1975 3,859,731

Fig_3
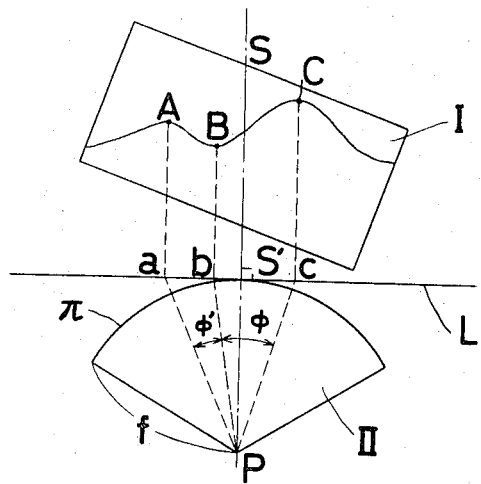
Fig_5
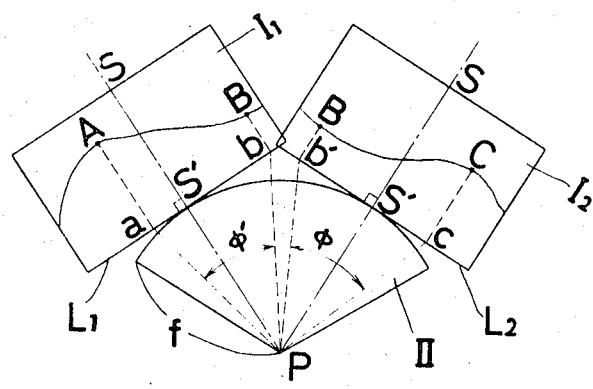

3,859,731

METHOD FOR DETERMINING THE POSITION OF A CAMERA FROM A PHOTOGRAPH TAKEN THEREBY AND DEVICE FOR PERFORMING THE SAME METHOD

BACKGROUND OF THE INVENTION

The present invention relates to a method and device for determining the position from which a photograph obtained by an ordinary camera was taken by obtaining the horizontal angles between at least three known objects in the photograph.

Heretofore, the sextant has been the main instrument used in determining the position of ships and in coastal surveying. Although conventional measuring devices have been improved in recent years through employmemt of electronic techniques, they are both expensive and complex.

A primary object of the present invention is to provide an arrangement for precisely and simply determining the actual position from which a photograph was taken.

SUMMARY OF THE INVENTION

In order to achieve the above objective, the present invention obtains the horizontal angles between at least three objects in the photograph and the position of the camera is determined directly on a map or chart or indirectly by calculation on the basis of the horizontal angles obtained.

Other objects and advantages of the present invention will be apparent from the following detailed description of the present invention with reference to the attached drawings.

BRIEF EXPLANATION OF THE DRAWINGS

FIG. 3 is an explanatory view showing how the camera position is determined using an inclined photograph;

FIG. 5 is an explanatory view showing another embodiment according to the present invention.

DETAILED DESCRIPTION OF THE INVENTION

Figure 1:
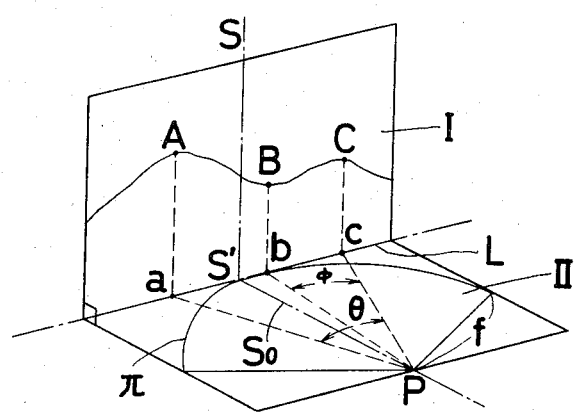
FIG. 1 is an explanatory view showing the principle of the present invention.

Returning now to FIG. 1, the principle of the present invention will be described. I is a full-sized photograph or negative; (hereinafter referred as "picture") of a scene including at least three objects (reference points), the positions of which are known, obtained by an ordinary camera having a lens whose focal length is $f$. The picture I is positioned vertically along a base line L which is tangential to a semicircle $\pi$ having a center P and a radius $f$ which is the focal length of the camera lens. A semicircular protractor II is disposed in the same plane as the semicircle $\pi$ in such a manner that the center of the protractor II coincides with the center P of the semicircle $\pi$ and the center line $S_o$ of the protractor II is aligned with the vertical central axis S–S' of the picture I.

Assuming that points which are the vertical projections of the reference points A, B and C in the picture I on the base line L are represented by $a$, $b$, and $c$ respectively, the angle $\theta$ between the lines connecting the point P to the points $a$ and $c$ is equal to a horizontal angle between the lines connecting the center P to the reference points A and C. This is true even when the picture I is put in the same plane as that in which the protractor is disposed. Accordingly, by obtaining the angle $\theta$ and the angle $\phi$ between the lines connecting the point P to the points $b$ and $c$, the actual position at which the picture was taken can be determined on an exactly reduced map or chart, because the positions of the reference points A, B and C are known on the same map or chart.

Figure 2:
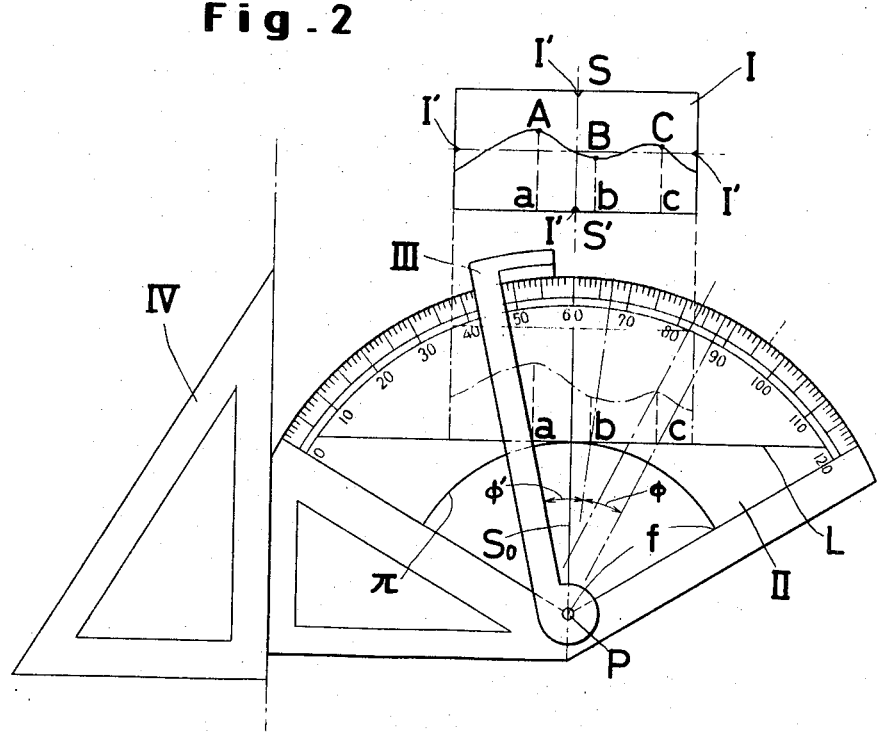
FIG. 2 is a plane view of a protractor used in analyzing the reference angles of the photograph according to the present invention.

Explaining the present invention in more detail with reference to FIG. 2, a protractor II of transparent material is provided with a vernier III which is rotatable about the center of the protractor positioned at P. The picture I is positioned on the base line L which is tangential to the semicircle $\pi$ having its center at P and having a radius of $f$ which is the focal length of the camera lens used, in such a manner that the center line $S_o$ of the protractor coincides with the central axis S–S' of the picture. Then the vernier III is rotated to read precisely the angles defined by the lines connecting the center P to the respective points $a$, $b$ and $c$ of the reference points A, B and C. Assuming, in this embodiment, that the center line of the protractor is defined as 60°, then the positions $a$, $b$ and $c$ are read as 48°, 67° and 88°, respectively. Accordingly, the angle $\phi'$ is 19°(=67°−48°) and $\phi$ is 21°(=88°−67°).

The most important point in this measurement is to place the center line $S_o$ of the protractor II exactly on the central axis S–S' of the picture. In order to facilitate this procedure, it is preferable to employ a camera capable of providing on the film a mark I' representing the vertical central axis and horizontal central axis of the film simultaneously with the shooting of the scene. In this case, the horizontal angles can easily be obtained by placing the protractor II so that the center line $S_o$ thereof is aligned with the central axis S–S' of the picture and then by moving the protractor, using a square IV to keep center line $S_o$ and the central axis S–S' in alignment, until it reaches a position at which it contacts tangentially with the semicircle $\pi$ having radius $f$.

In a case where the picture is shot at an inclination due to pitching and/or rolling of the ship on which the camera is mounted, the horizontal line of the picture must be either aligned with the base line L or disposed perpendicular to the central axis S–S' (see FIG. 3). Accordingly, in order to avoid such troublesome procedures, it is preferable to attach a levelling device etc. to the camera to maintain its attitude horizontal during the shooting.

The angles $\phi$ and $\phi'$ thus obtained are exactly equal to the horizontal angles between the lines connecting the point P and the reference points A, B and C respectively, and, by setting the angles for the known reference points A, B and C on a precisely reduced map, the point P of the camera which took the picture can be easily determined.

Since, in addition, the distances between the reference points A and B and between the points B and C and the angle $\alpha$ between the lines connecting the point A to B and B to C are all known on the map, the point P may also be determined by calculation from these.

Figure 4:
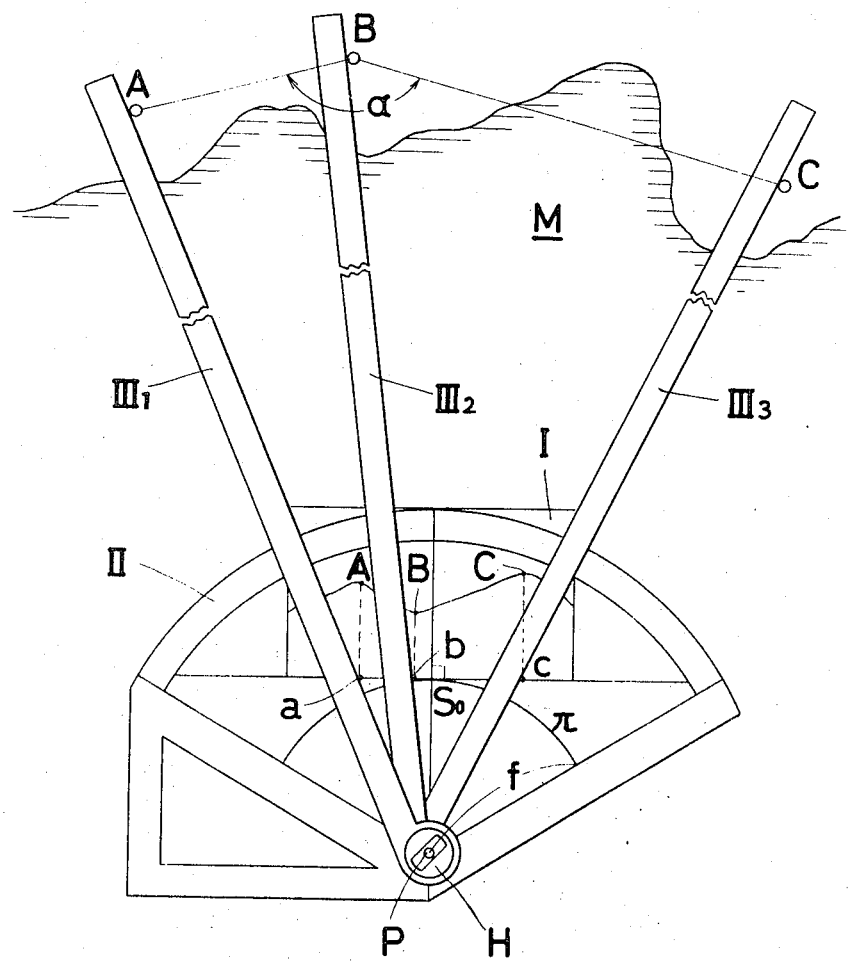
FIG. 4 is an illustration showing how the position of a ship is determined using a three vernier device.

While, in the embodiment shown in FIG. 2, a protractor having a single vernier III to read the angle $\phi$ and $\phi'$ is shown, it is possible to provide a protractor provided with a detachable vernier assembly comprising three verniers $III_1$, $III_2$ and $III_3$ to easily and directly determine the camera point on the map as shown in FIG. 4.

In the embodiment of FIG. 4, which is particularly suitable for determining the position of a ship at sea, a scene including reference points A, B and C on land is photographed by an ordinary camera or a polaroid camera etc. and a full-sized picture I of the scene is placed along a base line L separated from the center P of a protractor by a distance $f$ which is the focal length of the camera lens with the center line $S_0$ of the protractor aligned with the central axis of the picture. Then, the reference points A, B and C are transferred onto the base line L to form the projected points $a$, $b$ and $c$ and the three verniers $III_1$, $III_2$ and $III_3$ of the protractor are rotated about their center P to the respective points $a$, $b$ and $c$. Thereafter, the verniers are fixed by a clamp H to hold their angle relation. Thereafter the vernier assembly with the vernier fixed to each other is removed from the protractor and placed on a map or chart in such a manner that the respective verniers are put on the reference points A, B and C on the map M. That is, since the reference points A, B and C are shown on the map, the center P on the vernier assembly, when the verniers are on the respective reference points, corresponds to the ship position from which the scene including the reference points A, B and C was taken, and, in particular, to the focus point of the camera. In this case, it will be apparent that there is no need of reading angles and/or calculation and the camera point can easily be determined directly on the map.

On the other hand, when the three points suitable for use in position determination are spread over too wide an angle to be covered by the camera, the above described measurement cannot be performed because at least three reference points must be included in the picture in the above method. However, according to the present invention, the vertical angles $\phi$ and $\phi'$ can easily be determined by using the same camera to shoot one scene incuding two reference points and another scene adjacent to the first scene and including two reference points one of which is the same as one of the reference points of the first scene. That is, as shown in FIG. 5, the vertical projections $a$, $b$ and $c$ of the reference points A, B and C in the two pictures $I_1$ and $I_2$ are obtained. Then the central axis of the picture $I_1$ is positioned in alignment with the center line of the protractor at a position where the base line $L_1$ thereof contacts tangentially with the periphery of the circle having a center P and a radius $f$ which is equal to the focal length of the camera lens.

Thereafter, as in the previous case, the angle $\phi'$ is read by directing the verniers $III_1$ and $III_2$ of the protractor to the points $a$ and $b$ and the verniers are fixed at that angle $\phi'$. Similarly to this, the picture $I_2$ is also located on the base line or tangential line $L_2$ of the same circle and the vernier $III_2$ which now has a fixed relation to the vernier $III_2$ is directed to the point $b'$ corresponding to the reference point B in the picture $I_2$. Then the vernier $III_3$ of the protractor is directed to the point $c$ corresponding to the reference point C in the picture $I_2$ to determine the angle $\phi$ and the vernier $III_3$ is fixed to hold the angle relation between it and the vernier $III_2$. Thereafter the vernier assembly of the protractor which comprises the verniers $III_1$, $III_2$ and $III_3$ is removed and is placed on a map so that the reference points in the map are on the verniers respectively to thereby determine the camera point as the center P.

While the above embodiment has been described where the determination is performed by using a vernier assembly provided with three verniers, it is possible to determine the camera point by reading the angles $\phi$ and $\phi'$ by a protractor and calculating the point therefrom. In addition to this, two cameras can be mounted at a fixed angle relation and shoot adjacent scenes simultaneously in such a manner that at least a portion of one scene shot by one camera is shot by the other camera. If the two pictures are placed tangential to the periphery of the circle having a radius of $f$ in such a manner that the central axis of the two pictures are separated in angle corresponding to the angle between the cameras, the points $b$ and $b'$ in the pictures (corresponding to the common reference point B in the panoramic scene) will coincide, so that the camera point can be determined as easily as in the case where a picture having three reference points is used.

As heretofore described, according to the present invention, the determination of ship position can be obtained more easily and rapidly than with the conventional three vernier-protractor measuring method using two sextants. Furthermore, the present method eliminates errors which may occur in the conventional method when the measuring data are recorded by hand. Further, when a continuous oceanographical survey is conducted and the pictures in accordance with this invention are taken together with the collection of oceanographic data, the points at which significant data were measured can easily be identified later. In addition to this, the number of personnel required to perform the required measurements can be reduced and surveying of the sea can be sped up without any dificulty. Furthermore, since this invention permits easy determination of position in costal areas, it greatly facilitates the monitoring of sea pollution by speeding up surveys on the distribution of pollutants on and in the sea as well as at the bottom of the sea.

Another advantage of the present invention is that it can be used to determine positions not only on the sea but also in mountainous and expansive land areas and furthermore it can also be used to determine vertical angles and thus to determine the positions of flying objects.

What is claimed is:

1. A method of determing the position from which a rectangular photograph was taken, comprising the steps of disposing a rectangular photograph obtained by an ordinary camera and including at least three known reference points in such a manner that the base line of the rectangle is tangential to the periphery of a circle having a radius equal to the focal length of the lens of the camera which took the picture and the central axis of the photograph lies on an extension of a radius of the circle, perpendicularly projecting the reference points in the photograph onto the base line as projected points, measuring angles between the lines connecting the center of the circle to said projected points on the base line, and obtaining the position from which the photograph was taken as a point on a map also containing said known reference points by reconstructing on the map the measured angles obtained between said known reference points shown on said map.

2. A method as claimed in claim 1 wherein there are first and second photographs.

3. A method as claimed in claim 1 wherein the angles are measured by a protractor.

4. A method as claimed in claim 1 wherein the angles are measured by a protractor having three verniers thereon.

5. A method of determining the position from which two rectangular photographs were taken, comprising the steps of disposing said rectangular photographs obtained by an ordinary camera and including at least two known reference points in each photographs in such a manner that the base lines of the rectangles are tangential to the periphery of a circle having a radius equal to the focal length of the lens of the camera which took the pictures and the central axis of each of the photographs lies on an extension of a separate radius of the circle; perpendicularly projecting the reference points in the photographs onto the base lines as projected points; and measuring angles between the lines connecting the center of the circle to said projected points on the base lines, and obtaining the position from which the photographs were taken as a point on a map also containing said known reference points by reconstructing on the map the measured angles obtained between said known reference points shown on said map.

6. A method as claimed in claim 5, wherein there are at least three known reference points on one photograph.

7. A method as claimed in claim 5 wherein the angles are measured by a protractor.

8. A method as claimed in claim 5 wherein the angles are measured by a protractor having three veniers thereon.

* * * * *